United States Patent [19]
Kierson

[11] Patent Number: 5,311,814
[45] Date of Patent: May 17, 1994

[54] ASSEMBLY FOR EMBOSSING A PATTERN ON SURFACES OF A SLAT USED IN A VERTICAL BLIND ASSEMBLY

[76] Inventor: Jacob Kierson, 7530 NW. 79th St., Miami, Fla. 33166

[21] Appl. No.: 82,488

[22] Filed: Jun. 28, 1993

[51] Int. Cl.⁵ .......................... B41F 19/02; B44B 5/02
[52] U.S. Cl. .......................................... 101/6; 101/22; 101/32; 101/4; 160/236
[58] Field of Search .................. 101/3.1, 4, 5, 6, 22, 101/23, 32; 160/236

[56] References Cited

U.S. PATENT DOCUMENTS

| | | | |
|---|---|---|---|
| 3,229,623 | 1/1966 | Rubinstein et al. | 101/6 |
| 4,105,491 | 8/1978 | Haase et al. | 156/553 |
| 4,499,938 | 2/1985 | Toti | 160/236 |
| 4,600,461 | 7/1986 | Guy | 156/244.12 |
| 4,880,589 | 11/1989 | Shigemoto | 264/216 |
| 4,956,140 | 9/1990 | Rolles et al. | 264/280 |
| 5,029,413 | 7/1991 | Jovanovic | 160/236 |

Primary Examiner—Edgar S. Burr
Assistant Examiner—Lynn D. Hendrickson
Attorney, Agent, or Firm—Malloy & Malloy

[57] ABSTRACT

An assembly for forming or embossing a decorative pattern on at least one exposed surface of an elongated slat particularly of the type used in a vertical blind assembly. A pair of driven rollers are designed, disposed, dimensioned and configured to engage opposite sides of a slat immediately subsequent to its formation by a plastic extruder. The exterior surface of one of the rollers has the decorative patterns formed thereon and when forced into confronting engagement with an exposed surface of the slat, the decorative pattern is transferred by an embossing technique. The temperature of the rollers are regulated to facilitate transfer of the decorative pattern, continuous movement of the slat through the rollers and formation of the transverse or cross-sectional configuration of the slat concurrently to placing the decorative pattern thereon.

3 Claims, 1 Drawing Sheet

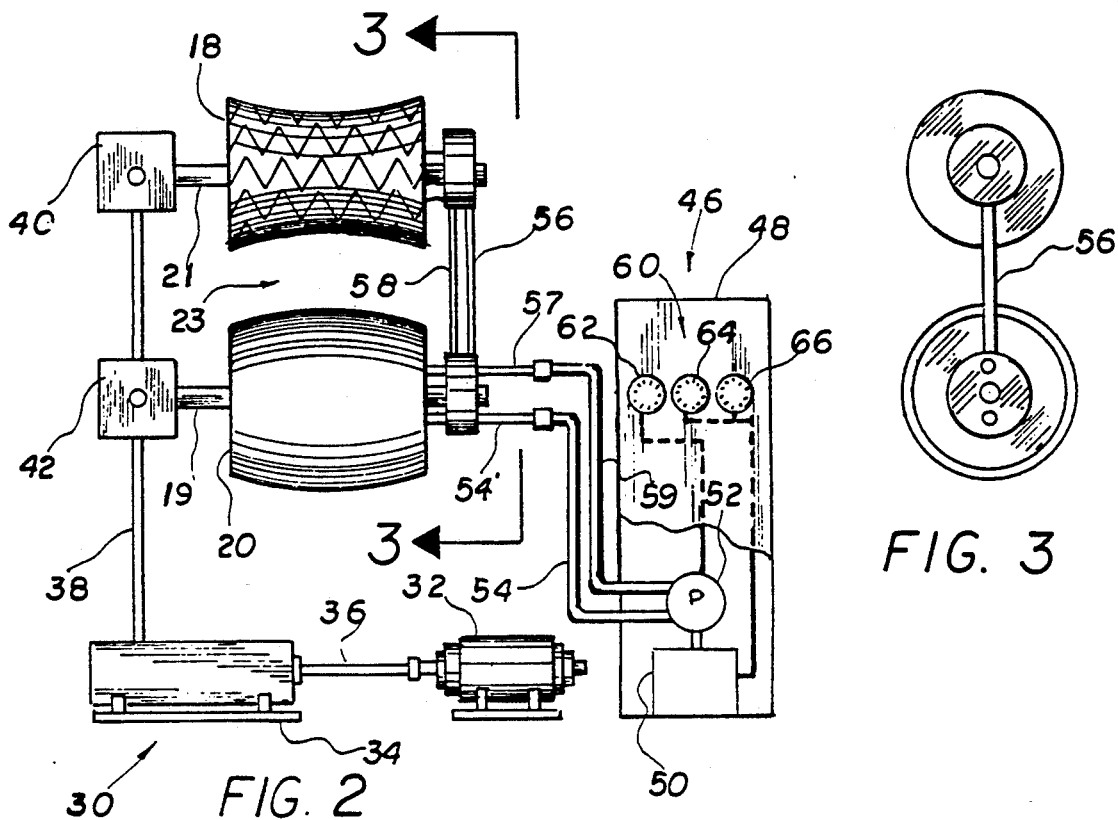
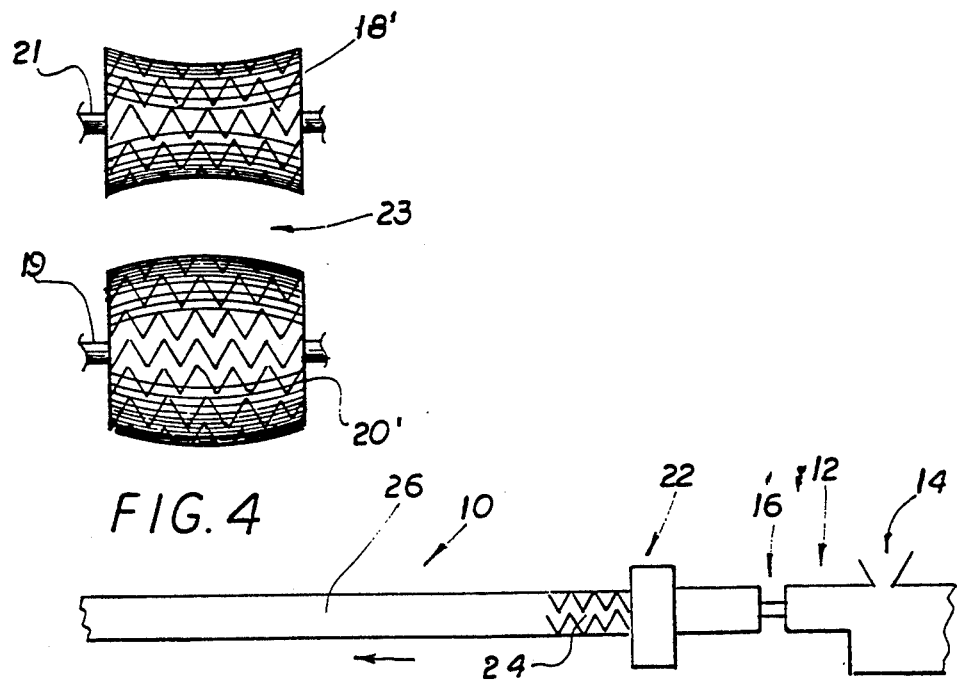

ASSEMBLY FOR EMBOSSING A PATTERN ON SURFACES OF A SLAT USED IN A VERTICAL BLIND ASSEMBLY

BACKGROUND OF THE INVENTION

1. Field of the Invention

This invention relates to an assembly for embossing a decorative pattern on at least one surface of a thermoplastic, synthetic material, particularly of the type used to form elongated vertical slats in a vertical blind assembly.

2. Description of the Prior Art

Elongated vertically oriented slats of the type used in vertical blind assemblies are of course well known in the art and commercially available in a wide variety of designs. The formation of such slats usually occurs through a forming machine such as but not limited to an extruder, forming an elongated continuous slat from a hot melt thermoplastic material.

One problem well recognized in this industry is the formation of the decorative pattern on at least one exposed surface of the vertical slat. Attempts have been made in this industry and in other areas to emboss a specific decorative pattern or like indication at least one exposed surface through the utilization of cooperative pairs of rollers engaging opposite surfaces of an elongated thermoplastic material. In such a known prior art application, one of the rollers has a roughened or otherwise specifically formed exterior surface which is continuously forced into confronting engagement with an exposed surface of the slat. The prior art procedure involves that transferring of the decorative pattern or like indicia from the exterior surface of the one roller to the confronted surface of the elongated thermoplastic strip being formed.

One well recognized problem in the vertical blind industry is the fact that the slat issues from the extruder or like forming machine in a somewhat semi-rigid state due to such material being formed at an increased temperature of approximately 340 degrees Fahrenheit to 365 degrees Fahrenheit. Obviously, this temperature may vary depending upon the particular method of formation and the thermoplastic material being used. Upon completion of the elongated slat, and after cooling it is in at least partially rigid state because it is greatly reduced in temperature. When so cooled, the amount of pull or driving force which may be applied to the slat can be in the range of normally 300 pounds per square inch. However, due to the increased temperature and the semi-rigid state of the slat as it issues from the forming machine, it is generally accepted that less than three pounds of "pull" can be exerted on the slat. While this is beneficial from the standpoint of forming or "embossing" a decorative pattern or like indicia on at least one exposed surface, it raises the problem of adequately forcing the elongated slat through the forming rolls in order to accomplish such preferred embossing.

The problem is compounded by the fact that the overall configuration and dimension of the slat is such as to be defined by a somewhat curvilinear cross-sectional configuration or "profile". In addition, the width or transverse dimension of the slat, after formation from the extruder, is substantially in the range of 3½ inches wherein the width ranges from 28/1000 of an inch to 31/1000. It is therefore seen that while the strip may be of adequate width to properly handle, the thinness of the slat presents a difficulty which adds to the problem of adequately embossing one or both surfaces of the elongated slat.

Again, it is recognized that prior art attempts have been made to emboss one or more exposed surfaces of an elongated thermoplastic, synthetic material slat or strip. Such prior art procedures are generally disclosed in the following U.S. patent.

The patent to Guy, U.S. Pat. No. 4,600,461 is directed towards an apparatus and process for producing an extruded plastic material product which is specifically indicated as consisting of an inner foamed thermoplastic cellular core and an outer nonporous thermoplastic skin extending along one side of the core the product is formed, at least in part from an extrusion machine. After exiting the dye outlet a film of nonporous material is applied along the extruded foamed material. It is important to note that rollers are engaging in opposite sides of the extruded product primarily for purposes of adhering the outer skin to the foamed product. There is specifically no indication of a pulling force being exerted on the formed product by positively driven rollers and it is questionable whether such is possible or intended by Guy since the strength of the material and its degree of rigidity is not clearly indicated as in the subject invention to be described in greater detail hereinafter.

The patent to Funakoshi et al, U.S. Pat. No. 4,111,626 is directed to a compacting machine utilizing a pair of opposed, compressing rollers associated with the material as it exists a hopper type of structure.

The patent to Johnston, U.S. Pat. No. 4,289,470 is directed to a lasagna noodle rippler machine and shares the use of opposing roles with some type of indented or recessed configuration apparently for purposes of shaping the cross sectional configuration of the resulting product.

The patent to Wittkopf, U.S. Pat. No. 4,591,757 discloses a multi-role calendar apparatus including 5 rollers mounted in a common horizontal plane wherein at least some of these roles are heated or otherwise temperature regulated the heated rollers or rolls include an outer finished surface which for purposes explained in detail are provided to imprint some type of design pattern on the resulting product.

The Shigemoto, U.S. Pat. No. 4,880,589 is specifically directed to process of the use of two cooperative rollers wherein the formed strip passes through the nip of the rollers and has one of its sides forced into engagement with a roughened exterior surface on one of the rolls.

The patent to Baus, U.S. Pat. No. 4,615,090 discloses a forming tool for the production of sheets including thermoplastic, synthetic material wherein the tool comprises a roller, a press or a casting mold and further wherein specific material are "blown" or forced into the nip of the forming roll to add to the configuration of the exposed surface or surfaces of the sheet being formed.

The patent to Schulz, U.S. Pat. No. 4,803,032 is directed to the embossing of a sheet of non-woven, fibrous web material such as toilet tissue with a series or identical embossed elements arranged in a uniform pattern in a manner to avoid nesting of the embossments and a resulting non-uniform product.

While the techniques, apparatus and procedures disclosed in the above-noted patents are believed to be operative and functional for their intended purpose, none address themselves to the specific formation of an embossed, decorative surface on at least one exposed surface of an elongated thermoplastic, synthetic material slat prior to cooling such slat wherein the thickness and transverse dimensions of the slat as well as the material from which it is formed are specifically applicable to use of such a slat in the vertical blind industry.

SUMMARY OF THE INVENTION

The present invention relates to an assembly for the forming, through embossing, of a decorative pattern or like indicia on at least one exposed surface of an elongated slat. The slat is formed from a synthetic, thermoplastic material of the type applicable for use in the production of elongated slats in the vertical blind industry. Such slats may be formed from a polyvinyl chloride or "PVC" or other like, substantially rigid material. In the formation of such slats, a single elongated slat is produced from a forming machine such as but not limited to a plastic extruder. The slat issues in a continuous length having the overall desired dimensions from the extruder or forming machine and, in accordance with the immediately a first and second roller. The first and second rollers are disposed in cooperative, immediately adjacent but somewhat spaced relation to one another so as to define a receiving space between the outer or exterior surfaces thereof. This receiving space is specifically configured and dimensioned so as to allow and aid in the passage of the formed slat therethrough. Further, the first and second rollers are structurally adapted such that the exterior surfaces of each roller is forced into continuous, confronting engagement with a correspondingly example, a first roller is rotatably mounted on some type of supporting frame so as to continuously engage what may be considered a front surface of the formed slat. The second roller is disposed on the opposite side of the slat as it passes through the rollers and receiving space defined therebetween. The exterior surface of the second roller similarly is forced into continuous confronting engagement with a "rear" surface of the slat almost immediately after its formation or issuance from the extrusion or forming machine.

An important feature of the present invention is the provision of a driving means. The driving means comprises a drive motor connected in driving relation to a gear assembly which in turn is connected, through appropriate linkage and driving shafts to each of the first and second rollers. Accordingly, the first and second rollers are continuously and positively driven in opposite directions such that a driving force is applied directly to the slat as it passes between the rollers through the receiving space between the exterior surfaces thereof. A positive driving force is thereby applied to the slat as the decorative pattern is embossed upon at least one exposed surface thereof.

This decorative pattern derives from the fact that the exterior surface of at least one of the rollers, preferably the first roller in contact with the front surface of the slat, also has the defined decorative surface integrally formed thereon. Therefore, continuous driven rotation of both the first and second rollers will aid in the passage and driving of the slat through the receiving space as well as cause the decorative surface integrally formed on the first roller to be embossed upon the exposed "front" surface of the slat.

Positive driving of both the first and second rollers is important in that it provides the aforementioned pulling or driving force to the slat as it passes between the rollers. Due to the fact that the slat may issue from the extrusion or forming machine at a somewhat higher that ambient temperature, generally in the range of 340 degrees Fahrenheit to 365 degrees Fahrenheit, it is in a highly flexible state. If in fact the rollers were not positively driven, as set forth above, through interconnection with the aforementioned driving means, there would be a tendency for the high temperature slat to "back up" prior to entering the receiving space between the first and second rollers. This would be due to the inordinate flexibility or resiliency of the material from which the slat was formed while the slat still has a substantially raised or higher temperature than ambient.

Another important feature of the present invention is the provision of a cooling means. The cooling means may take the form of a variety of somewhat conventional combined components including a refrigerator assembly and a pumping means. The refrigerator serves to reduce cooling fluid to a preferred temperature range. Upon reduction of such cooling fluid to the preferred temperature range, it is pumped into both of the first and second rollers, preferably into the interior thereof and continued to be circulated through what may be considered hollow interior portions of the first and second rollers. This will in effect reduce the temperature of the first and second rollers as they contact and drivingly engage the slat passing through the receiving space. A preferred range of temperature of the driving rollers is between 40 degrees Fahrenheit and 180 degrees Fahrenheit. Obviously, depending upon the material and other attendant factors, this temperature range may in fact vary. However, the temperature range should be such that the slat is cooled to a sufficient temperature where it becomes more rigid that it would be normally be when exiting the extrusion or forming machine. This will allow a greater driving force or "pull" to be applied directly to the slat as it is driven by the first and second rollers forcing it through the receiving space and along an intended path of travel downstream of the first and second rollers for further processing.

Another feature associated with the rollers is that their exterior surfaces may be congruently configured in order to aid in the formation of the "profile" or cross-sectional configuration of the slat. In a preferred embodiment and as is well recognized in the vertical blind industry, such vertical blinds have a somewhat curvilinear cross-sectional configuration such that the "front" surface has a convex configuration and the "rear" surface has a substantially concave cross-sectional configuration. The exterior surfaces of the first and second roller are therefore appropriately formed in order to provide the aforementioned, predetermined and desired cross-sectional configuration of the slat.

Other features of the present invention, to be described in greater detail hereinafter, include the provision of both exterior surfaces of the first and second roller having a decorative pattern formed thereon wherein such respective decorative patterns are transferred, through embossing, to the front and rear exposed surfaces of the slat as it passes between the first and second rollers through the receiving space.

The subject invention therefor defines a structure in the form of the first roller and second roller being disposed in completely spaced relation from one another but yet interconnected through driving means so as to rotated both rollers in opposite directions but in a positive manner. The structural adaptation of the rollers and the drive means associated there with is such as to exert a pulling force on the formed plastic slat concurrently to the pattern being embossed on at least one of two opposite surfaces of the slat. In addition the cooling means associated with the rollers is provided to incorporate both the refrigeration assembly and the pump means to accomplish cooling of fluids and the pumping of such fluids and circulating of such fluids through both rollers simultaneously to coming in contact with the slats being formed. The structural adaptation of the cooling means has the unique feature of cooling the rollers to the point where the slat is at least minimally hardened by reducing the surfaces of the slat to a lower temperature then the temperature maintained by the slat from the extrusion machine. As emphasized above concurrent exertion of a pulling force while at the same time reducing the temperature of the surfaces of the slat allows the slat to be pulled giving it a driving force along its path of travel even after it leaves the first and second rollers. It should be recognized through a detailed examination provided herein that absent this feature of a pulling force being exerted on the slat, there would be "back up" of the slat which would not allow it to be propelled along its intended path of travel.

BRIEF DESCRIPTION OF THE DRAWINGS

For a fuller understanding of the nature of the present invention, reference should be had to the following detailed description taken in connection with the accompanying drawing in which:

FIG. 1 is a schematic view of the formation of an elongated thermoplastic, synthetic material slat issuing from an extrusion or like forming machine and through forming rollers which are part of the present invention.

FIG. 2 is a schematic representation of the embodiment of FIG. 1 providing details of the forming rollers.

FIG. 3 is and end view along line 3—3 of the embodiment of FIG. 2.

FIG. 4 is yet another embodiment of the present invention.

Like reference numerals refer to like parts throughout the several views of the drawings.

DETAILED DESCRIPTION OF THE PREFERRED EMBODIMENT

As shown in FIGS. 1 through 4, the present invention is directed to the forming of a decorative pattern or like indicia on and elongated slat of synthetic, thermoplastic material generally indicated as 10. The slat, in the conventional fashion, is produced by a forming machine generally indicated as 12. The forming machine may be in the form of an extruder or like apparatus wherein thermoplastic, synthetic material is added as at 14 and heated to a temperature sufficient to allow formation through extrusion or by other techniques. Once formed in the elongated strip, it passes from an exit end generally indicated as 16 of the forming machine 12 and into at least one pair of forming rollers. The forming rollers comprise a first roller 18 and a second roller 20 to be described in greater detail hereinafter. The first and second rollers 18 and 20 are supported by any type of applicable support frame or base as at 22 disposed substantially immediately adjacent to the exit end 16 of the forming machine 12.

It should be emphasized that an important feature in the formation of the elongated slat 10 is that such slat exits the forming machine 12 generally at a temperature well above ambient temperature and generally in the range of 340 degrees Fahrenheit to 365 degrees Fahrenheit. At such raised temperature, the slat is extremely flexible and is capable of enduring only a minimum "pull" force or driving force thereon. Such minimal force is generally in the range of approximately three pounds per square inch. When such thermoplastic material is cooled to ambient temperatures, the pulling force is generally in the range of approximately 300 pounds per square inch. Obviously, such range of forces will vary dependent upon temperature, type of material, etc. one important feature of the present invention is directed to the forming, through embossment, of a decorative pattern generally indicated as 24 on an exposed surface 26 of the slat 10 being formed. Such embossment occurs through cooperative engagement and driving contact with the first and second rollers 18 and 20 as will be explained in greater detail hereinafter. However, the slat 10 must be of a sufficient temperature to allow the decorative pattern to be integrally formed within the preferred exposed surface as at 26 as intended. Also, it should be noted that while the specific embodiments as set forth in greater detail hereinafter are described with relation to the production and formation of slats of the type used in the vertical blind industry, other materials can also be used incorporating the apparatus and procedures of this invention to produce other products having embossed, decorative patterns on exposed surface portions thereof.

Turning to the embodiment of FIG. 2, it is seen that the first and second rollers 18 and 20 respectively are disposed a spaced apart distance from one another so as to define a receiving space generally indicated as 23 therebetween. While schematically represented in FIG. 2, the receiving space 23 is in reality only a minimal distance between the exterior surfaces of the first roller 18 and the second roller 20. This minimum distance is dimensioned so as to only receive the slat 10 therethrough while at the same time having the exterior surfaces of both rollers 18 and 20 disposed in confronting and driving engagement with the correspondingly positioned front and rear surfaces of the slat.

In order to prevent any undue gathering or "bunching" of the slat prior to entering the receiving space 23, two important features of the present invention are here emphasized. First, the rollers 18 and 20 are independently and positively driven in opposite directions through the provision of a drive means generally indicated as 30. The driving means includes a drive motor 32 connected to a gear assembly indicated in part as 34 by appropriate connecting link 36. Activation of the drive motor 32 causes operation and activation of the gear assembly 34 causing forced rotation of one or more primary drive shafts as at 38. Two drive gears 40 and 42 are driven by the primary drive shaft or shafts 38 and each of the drive gears 40 and 42 serve to positively rotate, on a substantially continuous basis, the respective first and second rollers 18 and 20 by means of secondary drive shafts 19 and 21. This in turn imparts a driving force or "pull" to the elongated slat 10 as it passes between eh rollers 18 and 20 and through the receiving space 23.

The second important feature to be emphasized is the first and second rollers 18 and 20 being cooled to within a preferred temperature range simultaneously to being positively driven. Such temperature range preferably is substantially between 40 degrees Fahrenheit and 180 degrees Fahrenheit. This is accomplished by a cooling means generally indicated as 46. The cooling means may take the form of a self contained housing as at 48 having a plurality of substantially conventional components in order to accomplish cooling of the rollers 18 and 20. More specifically, the cooling means may include a refrigerator assembly or apparatus as at 50 for the purpose of cooling a coolant fluid such as a liquid or gas and preferably in the form of water. The water or other coolant fluid is driven by a pump as at 52 to the interior of each of the first and second rollers 18 and 20. Such is conducted through an incoming conduit 54 and 54' which delivers water or like coolant first into the interior of the second roller 20. At the same time a connecting pipe as at 56 serves to deliver the same coolant fluid to the interior first roller 18. The coolant fluid is constantly circulated throughout the hollow interior of both the first and second rollers 18 and 20. Accordingly, the coolant fluid once entering the respective rollers 18 and 20 is circulated throughout the hollow interiors thereof and then empties through outlet conduits as at 58 and 57. A connecting conduit as at 59 serves to return the expelled water from the interior of the rollers back to the pump 52 to define what may be considered a closed circulating system.

Operation of both the refrigerator 50 and the pump 52 may be accomplished by a conventional control means generally indicated as 60. The control means may include regulating dials and switches as at 62, 64 and 66 to respectively control the speed and/or activation of the pump 52 and the temperature range of the refrigeration means 50 thereby regulating both the input and output of the coolant fluid and the temperature thereof.

It should be apparent therefore that both the positive driving force of both rollers as well as the specific cooling of the rollers to within a certain preferred temperature range is important to the adequate embossing of the decorative pattern as at exterior surface of the first roller 18. The embossed pattern is formed either integrally or otherwise on the exterior surface of the first roller 18 and is structurally adapted to be force into the at least partially impressionable "front" surface 26 of the slat 10 as indicated as 24 in FIG. 1.

FIG. 4 shows the first and second rollers 18' and 20' each having a decorative pattern formed on the exterior surface thereof. The rollers are positively driven by the secondary drive shafts 19 and 21 similar to that of the embodiment of FIG. 2. Further, since both the exterior surfaces of the first and second rollers 18' and 20' are disposed in confronting, driving engagement with the correspondingly positioned front and rear surfaces of the slat 10, the predetermined decorative pattern is embossed on both those surfaces.

Yet another feature of the present invention is the congruent configuration of the exterior surfaces of the first and second rollers 18 and 20 (as well as the firs and second rollers 18' and 20' ) so as to aid in the formation of the transverse or cross-sectional configuration of the formed slat 10 once exiting from the rollers 18 and 20 has a substantially curvilinear configuration. This curvilinear configuration is preferably defined by a convex front face and a concave rear face. In turn and congruently, the concave and convex respectively to accomplish the preferred cuvilinear configuration.

Now that the invention has been described:
What is claimed is:

1. An assembly for the embossing of a pattern on at least one exposed surface of an elongated, thermoplastic material slat while the slat is in a heated, semi-rigid state immediately subsequent to formation thereof from a heated melt by a forming machine, said assembly comprising:
   a. a first roller and a second roller each rotatably mounted in immediately adjacent and spaced apart relation to one another and disposed downstream of the forming machine in receiving relation to the slat issuing therefrom,
   b. said first and second rollers each including an exterior surface cooperatively configured relative to one another and said respective exterior surfaces disposed in space, non-engaging relation to one another,
   c. a receiving space defined between said exterior surfaces and dimensions to allow the slat to travel through said receiving space in engaging relation to both said exterior surfaces on said first and second rollers,
   d. driving means connected to said first and second rollers for forced rotation of both said rollers and comprising a drive motor connected to a gear assembly, said gear assembly arranged to positively drive said first and second rollers in opposite directions and exert a pulling force on the slat as it passes through said receiving space,
   e. said first and second rollers arranged to position said respective exterior surfaces thereof in movable, driving engagement with correspondingly positioned opposite surfaces of the slat, the slat being forced through the receiving space and along the intended path of travel beyond said first and second rollers,
   f. said first roller and said second roller having respective exterior surfaces disposed in confronting, driving engagement with a front surface and a rear surface respectively of the slat,
   g. said exterior surface of said first roller having a decorative pattern formed thereon and being structurally adapted to emboss the corresponding engaged front surface of the slat with said decorative pattern,
   h. cooling means connected to each of said first and second rollers for reducing the temperature thereof and a temperature of opposite surfaces of the slat confronting said exterior surfaces of said first and second rollers of the slat passing through said receiving space,
   i. said cooling means including a refrigeration assembly and a pumping means respectively adaptive for cooling a fluid and pumping the fluid into heat transferring engagement with both said first and second rollers,
   j. said first and second rollers and said cooling means cooperatively adapted to concurrently and respectively exert a pulling, driving force on and a reduction in temperature of the slat passing through said receiving space,
   k. said pumping means defining a portion of a substantially closed circulating system further defined by a path of fluid flow between and through both said first and second rollers and said pump means,
   l. said cooling means further comprising regulating means connected to said refrigeration assembly and structurally adapted for regulating the temperature cooling fluid issuing from said cooling means sufficient to maintain both said first and second rollers substantially between a temperature of 40 degrees Fahrenheit and 180 degrees Fahrenheit, and m. said first and second rollers being adjustable relative to one another and said receiving space between said exterior surfaces of said first or second rollers being adjustable to regulate the dimension thereof and the intended pressure of said respective exterior surfaces of said rollers on the opposite surfaces of the slat.

2. An assembly as in claim 1 wherein said exterior surface of said first and second rollers are congruently configured relative to one another to aid in the formation of a cross-sectional configuration of the slat.

3. An assembly as in claim 2 wherein said exterior surface of said first roller comprises a substantially concave configuration and said exterior surface of said second roller comprises a substantially convex configuration.

* * * * *